(12) United States Patent
Kansaku

(10) Patent No.: US 8,520,284 B2
(45) Date of Patent: Aug. 27, 2013

(54) DIAPHRAGM DEVICE FOR PROJECTOR

(75) Inventor: Yasumasa Kansaku, Kawasaki (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 248 days.

(21) Appl. No.: 13/210,988

(22) Filed: Aug. 16, 2011

(65) Prior Publication Data
US 2012/0044558 A1    Feb. 23, 2012

(30) Foreign Application Priority Data
Aug. 17, 2010   (JP) ................................ P2010-182481

(51) Int. Cl.
*G02B 26/02*   (2006.01)
*G03B 21/14*   (2006.01)

(52) U.S. Cl.
USPC ............. 359/230; 359/232; 359/233; 253/97

(58) Field of Classification Search
USPC ................. 359/230, 232, 233; 396/449, 450, 396/452, 458–460, 505, 507; 353/75, 85, 353/88, 97
See application file for complete search history.

(56) References Cited

U.S. PATENT DOCUMENTS

| | | | | |
|---|---|---|---|---|
| 2,694,336 A | * | 11/1954 | Waldeyer | 352/68 |
| 3,074,335 A | * | 1/1963 | Graves | 396/220 |
| 3,410,189 A | * | 11/1968 | Spokowski | 396/505 |
| 3,858,972 A | * | 1/1975 | Hirosawa et al. | 353/118 |
| 5,045,873 A | | 9/1991 | Shinozaki et al. | |
| 6,158,297 A | * | 12/2000 | Polosky et al. | 74/414 |
| 6,164,780 A | * | 12/2000 | Noto et al. | 353/122 |
| 7,798,653 B2 | * | 9/2010 | Inui et al. | 353/97 |
| 2009/0174869 A1 | * | 7/2009 | Inui et al. | 353/91 |
| 2010/0238419 A1 | * | 9/2010 | Mochizuki | 353/97 |

FOREIGN PATENT DOCUMENTS

| | | |
|---|---|---|
| JP | 2-146631 | 12/1990 |
| JP | 11-064971 | 3/1999 |
| JP | 2004-302108 A | 10/2004 |

OTHER PUBLICATIONS

Official Action issued on Jan. 29, 2013 in the counterpart Japanese application No. 2010-182481.

* cited by examiner

*Primary Examiner* — Frank Font
(74) *Attorney, Agent, or Firm* — Nath, Goldberg & Meyer; Jerald L. Meyer; Stanley N. Protigal

(57) ABSTRACT

A diaphragm device for projector includes a first gear unit, a second gear unit and two diaphragm plates. The first gear unit includes a partial circular arc portion and a gear portion with partial no tooth. The second gear unit includes a circular arc portion corresponding to the partial circular arc portion, and a pinion and a gear corresponding to the gear portion with partial no tooth. When the partial circular arc portion abuts on the circular arc portion, the gear does not rotate. When the partial circular arc portion does not abut on the circular arc portion, the gear portion with partial no tooth meshes the gear to transmit rotation of the first gear unit to the gear. The two diaphragm plates each on which a rack meshing the pinion is formed, moves in directions opposed to each other according to rotation of the pinion.

2 Claims, 10 Drawing Sheets

FIG. 12A
FIG. 12B
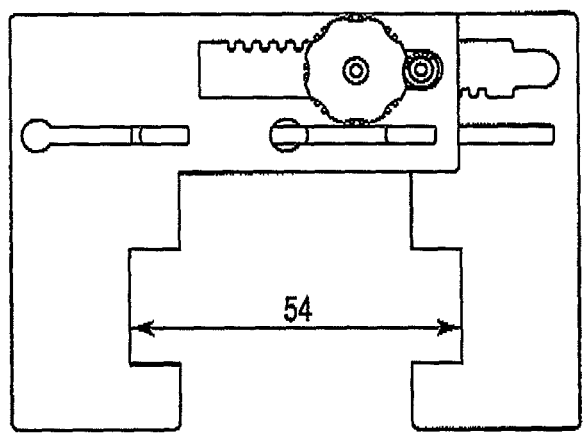
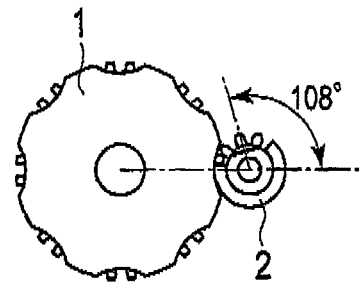
FIG. 13A
FIG. 13B
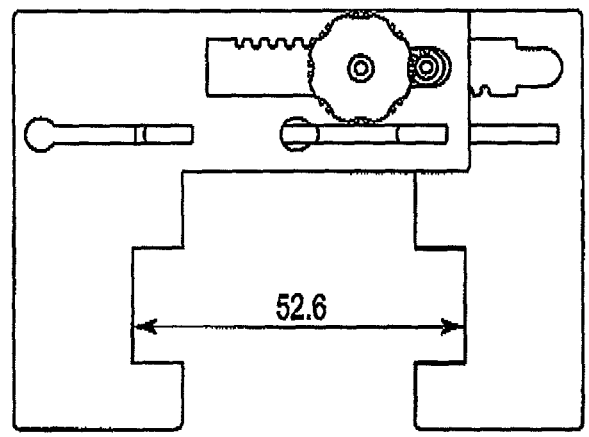
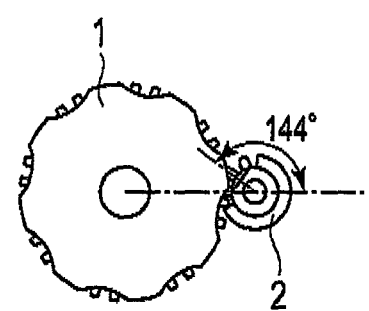

FIG. 14A
FIG. 14B
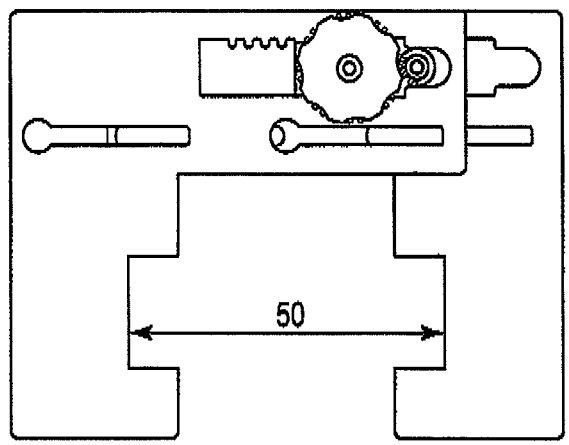
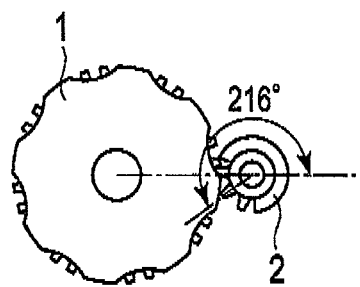
FIG. 15A
FIG. 15B
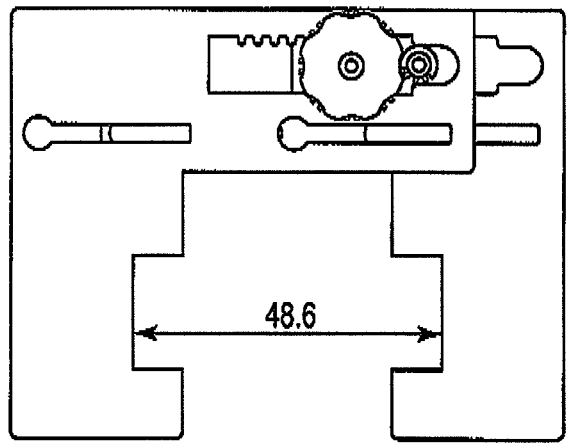
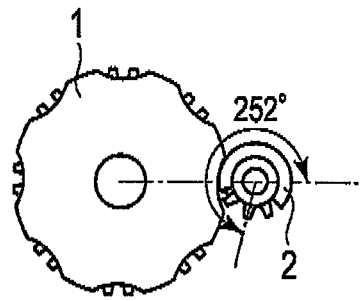

DIAPHRAGM DEVICE FOR PROJECTOR

CROSS REFERENCE TO RELATED APPLICATION

This application claims benefit of priority under 35 U.S.C. §119 to Japanese Patent Application No. 2010-182481, filed on Aug. 17, 2010, the entire contents of which are incorporated by reference herein.

BACKGROUND OF THE INVENTION

1. Field of the Invention

The present invention relates to a diaphragm device for projector.

2. Description of the Related Art

In various projectors including a liquid crystal projector, there is a projector that adjusts an amount of light illuminated from a light source to increase contrast by changing the amount of light illuminated according to a screen size or environmental brightness or excluding light from an outer side away from a light axis in an illumination optical system. In this case, the projector often adjusts an amount of light illuminated by not changing an amount of luminescence of the light source but instead arranging a diaphragm device in a certain position in front of a resolution optical system from the light source.

Patent document 1 (Japanese Published Unexamined Patent Application No. 2004-302108) discloses a diaphragm device for projector that moves two diaphragm plates, each of which has linear open regulation edges, in directions opposed to each other by a motor. More specifically, the diaphragm plates each of which is formed in L-letter shape are arranged between two ground plates. Two operation members each of which has arm portions at both sides thereof are respectively mounted the ground plates. Each of the operation members is rotated around an axis by the motor, which reciprocates via pins the diaphragm plates along a diagonal line of an aperture portion surrounded by the linear open regulation edges of the diaphragm plates. By this reciprocation, the linear open regulation edges of the diaphragm plates change a size of aperture for path of light illuminated.

The liquid crystal projector uses a lens array type illumination optical system composed of a first lens array and a second lens array to increase illumination efficiency and improve illuminance uniformity on a screen. A diaphragm device, which is arranged in a projector using the illumination optical system, is often configured to change an area of aperture while the aperture keeps a rectangular shape. However, when the diaphragm plates stop in a state where an edge of the aperture strides across respective lens segments of each lens array, the edge of the aperture blocks a part of light illuminated at a position where it strides across the respective lens segments. This affects an illuminance distribution on a screen. Therefore, it is desirable that the diaphragm plates stop in a state where the edge of the aperture stops along a border of each lens segment without striding across the respective lens segments.

In a conventional diaphragm device for projector such as the diaphragm device disclosed in the patent document 1, a rotation angle of a motor is substantially proportional to a movement distance of an edge of aperture. This needs to control the rotation angle of the motor at a certain angle to stop the edge of aperture along a border of each lens segment of each lens array. In addition, since a rotation axis of the motor spins around in a state where an electric source is not turned on in the nature of motor, there is a possible that the edge of aperture brings unexpected displacement due to some factors.

SUMMARY OF THE INVENTION

The present invention has an object to provide a diaphragm device for projector that moves two diaphragm plates in directions opposed to each other by a motor and intermittently stops the diaphragm plates.

In order to solve the above-described conventional technical problem, the present invention provides a diaphragm device for projector comprising: a first gear unit that includes a partial circular arc portion and a gear portion with partial no tooth; a second gear unit that includes a circular arc portion on which concave circular arcs are formed along a circumferential direction thereof corresponding to the partial circular arc portion of the first gear unit, and a pinion and a gear corresponding to the gear portion with partial no tooth of the first gear unit, wherein when the partial circular arc portion of the first gear unit abuts on the circular arc portion, the gear does not rotate even if the first gear unit rotates, and when the partial circular arc portion of the first gear unit does not abut on the circular arc portion, the gear portion with partial no tooth of the first gear unit meshes the gear to transmit rotation of the first gear unit to the gear; and two diaphragm plates each on which a rack that meshes the pinion of the second gear unit is formed at a part thereof, that moves in directions opposed to each other according to rotation of the pinion of the second gear unit.

In a preferred embodiment of the present invention, the gear of the second gear unit includes a no tooth portion at a part thereof, and the second gear unit stops rotating when a tooth of the gear portion with partial no tooth reaches the no tooth portion of the gear of the second gear unit.

According to the present invention, the diaphragm device for projector can move two diaphragm plates in directions opposed to each other by a motor and intermittently stop the diaphragm plates.

BRIEF DESCRIPTION OF THE DRAWINGS

FIGS. 12A and 12B are diagrams that illustrate behavior of the gear unit 1 (second gear unit) and the diaphragm plates 6 and 7 in a case where a rotation angle of the gear unit 2 (first gear unit) is 108 degrees.

FIGS. 13A and 13B are diagrams that illustrate behavior of the gear unit 1 (second gear unit) and the diaphragm plates 6 and 7 in a case where a rotation angle of the gear unit 2 (first gear unit) is 144 degrees.

FIGS. 14A and 14B are diagrams that illustrate behavior of the gear unit 1 (second gear unit) and the diaphragm plates 6 and 7 in a case where a rotation angle of the gear unit 2 (first gear unit) is 216 degrees.

FIGS. 15A and 15B are diagrams that illustrate behavior of the gear unit 1 (second gear unit) and the diaphragm plates 6 and 7 in a case where a rotation angle of the gear unit 2 (first gear unit) is 252 degrees.

DESCRIPTION OF THE EMBODIMENTS

A diaphragm device for projector according to each exemplary embodiment of the present invention will be described below, with reference to FIGS. 1 to 19.

First Exemplary Embodiment

Figure 1:
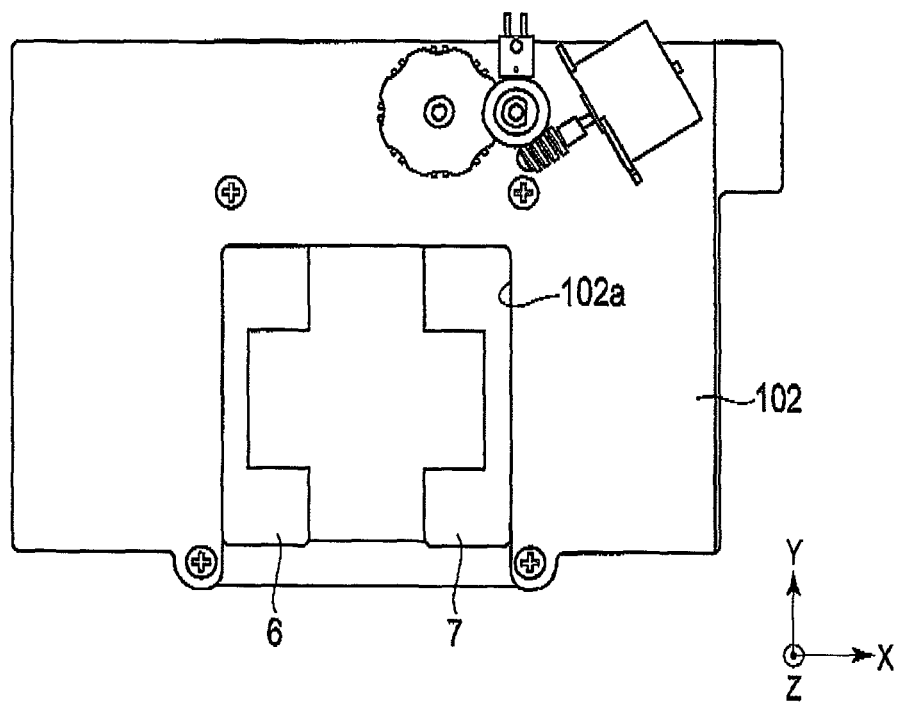
FIG. 1 is a front diagram of a diaphragm device for projector according to a first exemplary embodiment of the present invention.
Figure 2:
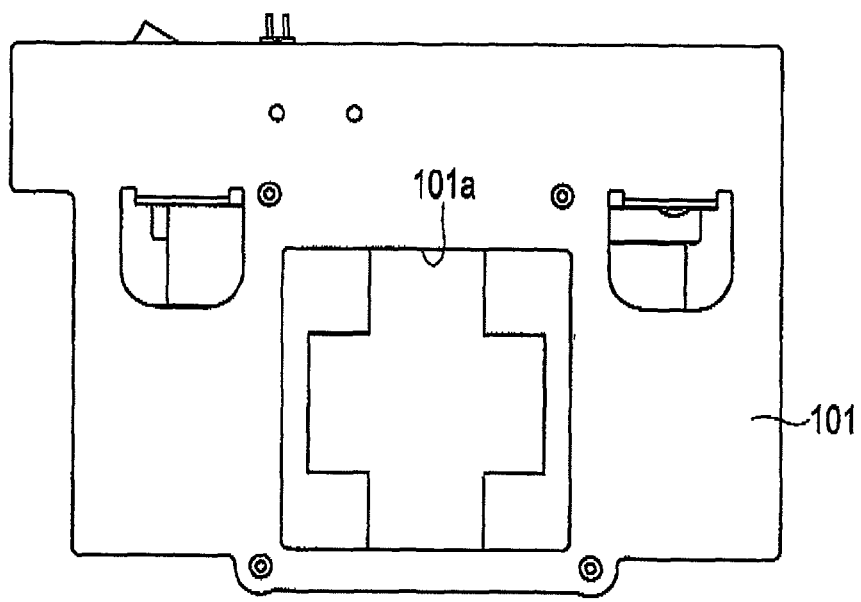
FIG. 2 is a back diagram of the diaphragm device for projector according to the first exemplary embodiment of the present invention.

FIG. 1 is a front diagram of a diaphragm device for projector according to a first exemplary embodiment of the present invention. FIG. 2 is a back diagram of the diaphragm device for projector according to the first exemplary embodiment of the present invention. As shown in FIGS. 1 and 2, a base 101 is a member that holds the diaphragm device and has an aperture portion 101a for light path formed in a rectangular shape. A cover 102 is spaced from the base 101 at a certain distance and is mounted to the base 101 by a proper means. The cover 102 has a cutting portion 102a for light path formed in a rectangular shape. Although the cover 102 has the cutting portion 102a in the present embodiment, the cover 102 may have an aperture portion instead of the cutting portion as well as the base 101.

Figure 3:
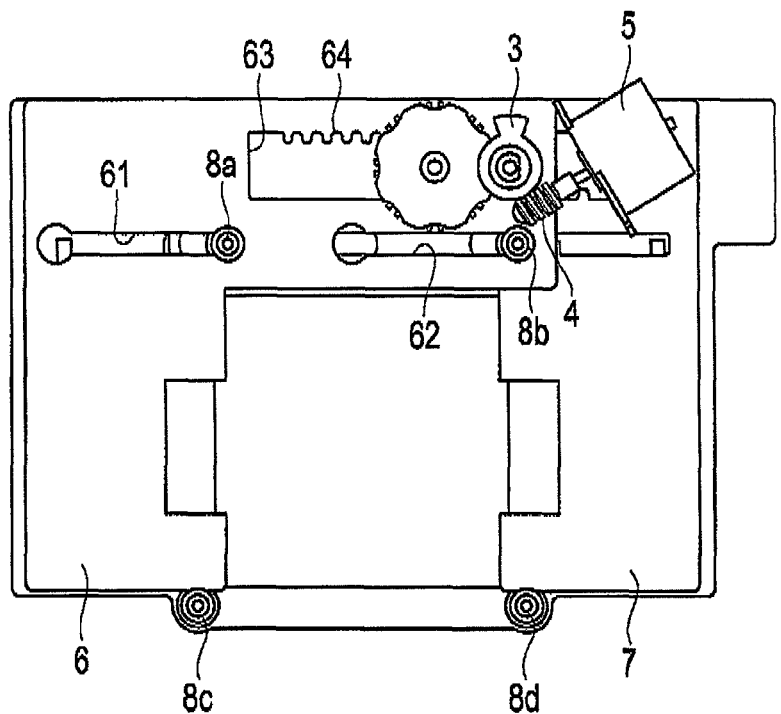
FIG. 3 is a front diagram of the diaphragm device for projector in a situation where a cover 102 is removed therefrom according to the first exemplary embodiment of the present invention.
Figure 4:
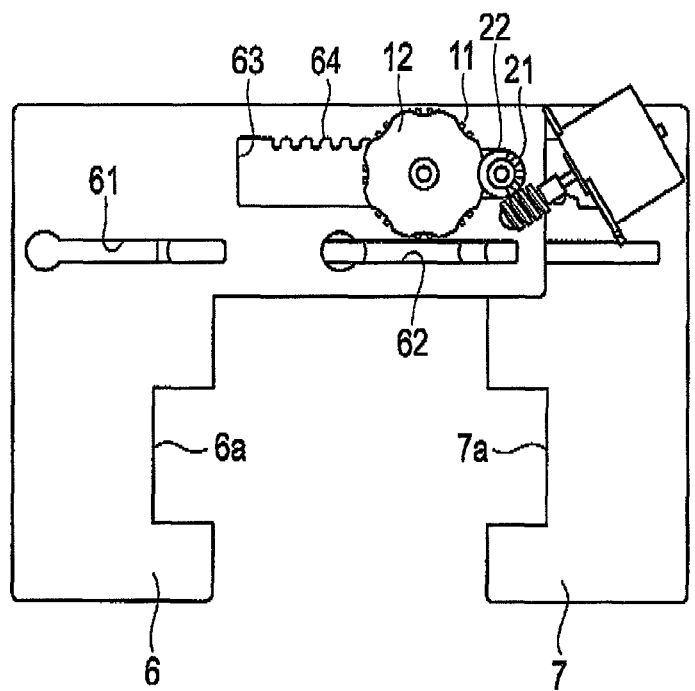
FIG. 4 is a front diagram of the diaphragm device for projector in a situation where a base 101, the cover 102 and a gear unit 3 (third gear unit) are removed therefrom according to the first exemplary embodiment of the present invention.
Figure 5:
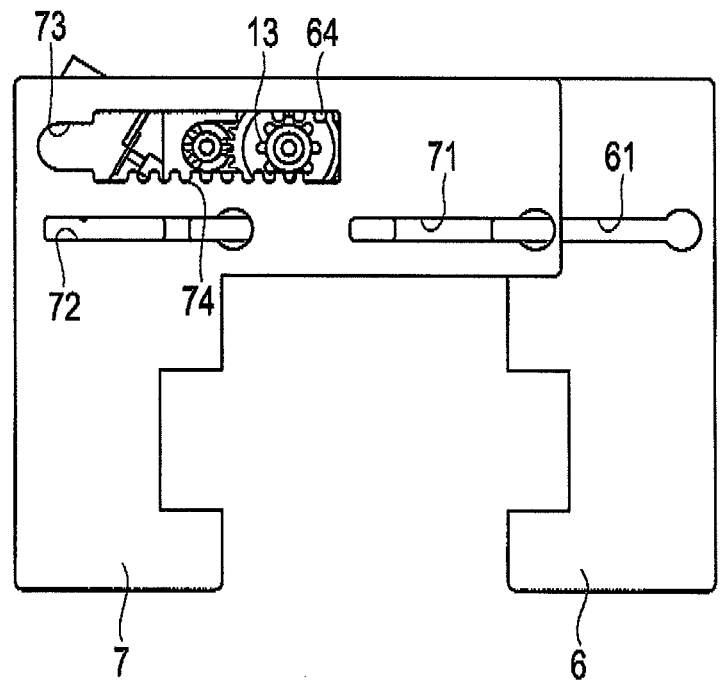
FIG. 5 is a back diagram of the diaphragm device for projector in the situation where the base 101, the cover 102 and the gear unit 3 (third gear unit) are removed therefrom according to the first exemplary embodiment of the present invention.
Figure 6:
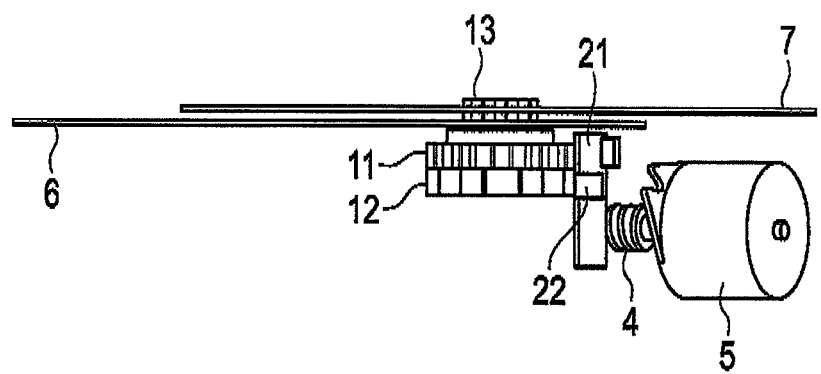
FIG. 6 is a plane diagram of the diaphragm device for projector in the situation where the base 101, the cover 102 and the gear unit 3 (third gear unit) are removed therefrom according to the first exemplary embodiment of the present invention.
Figure 7:
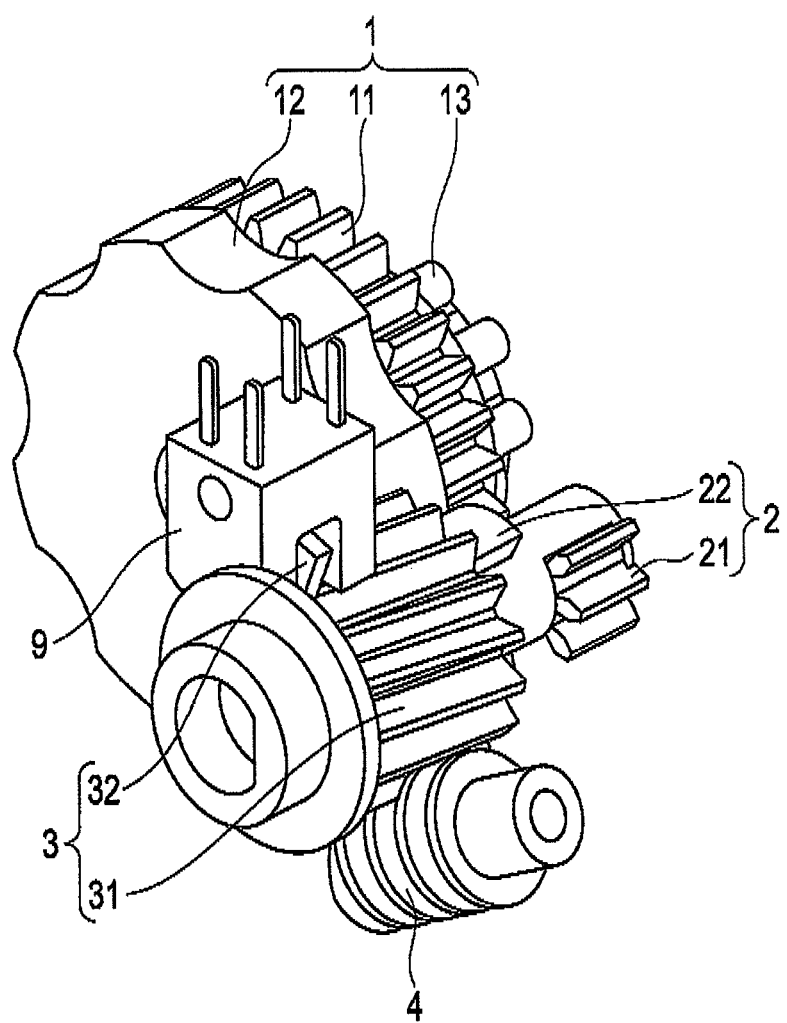
FIG. 7 is a perspective diagram that illustrates a structural relation among a gear unit 1 (second gear unit), a gear unit 2 (first gear unit) and the gear unit 3 (third gear unit) according to the first exemplary embodiment of the present invention.

FIG. 3 is a front diagram of the diaphragm device for projector in a situation where the cover 102 is removed therefrom according to the first exemplary embodiment of the present invention. FIG. 9 is a front diagram of the diaphragm device for projector in a situation where the base 101, the cover 102 and a gear unit 3 (third gear unit) are removed therefrom according to the first exemplary embodiment of the present invention. FIG. 5 is a back diagram of the diaphragm device for projector in the situation where the base 101, the cover 102 and the gear unit 3 are removed therefrom according to the first exemplary embodiment of the present invention. FIG. 6 is a plane diagram of the diaphragm device for projector in the situation where the base 101, the cover 102 and the gear unit 3 are removed therefrom according to the first exemplary embodiment of the present invention. FIG. 7 is a perspective diagram that illustrates a structural relation among a gear unit 1 (second gear unit), a gear unit 2 (first gear unit) and the gear unit 3 according to the first exemplary embodiment of the present invention.

Diaphragm plate guides 8a, 8b, 8c and 8d are mounted on the base 101. Grooves 61 and 62 are formed on a diaphragm plate 6. Grooves 71 and 72 are formed on a diaphragm plate 7. The diaphragm plate guide 8a passes through the groove 61 of the diaphragm plate 6 and the groove 71 of the diaphragm plate 7. The diaphragm plate guide 8b passes through the groove 62 of the diaphragm plate 6 and the groove 72 of the diaphragm plate 7. The diaphragm plate guide 8c is provided with a round groove (not shown) thereon. An end portion of the diaphragm plate 6 is pressed against the round groove of the diaphragm plate guide 8c. The diaphragm plate guide 8d is provided with a round groove (not shown) thereon. An end portion of the diaphragm plate 7 is pressed against the round groove of the diaphragm plate guide 8d. The diaphragm plate guides 8a, 8b, 8c and 8d regulate movements of the diaphragm plates 6 and 7 in a Y-axis direction (see FIG. 1) and allows movements of the diaphragm plates 6 and 7 in an X-axis direction (see FIG. 1) which is parallel to a direction of grooves. When the diaphragm plates 6 and 7 move in the X-axis direction, an area and shape of aperture formed by the diaphragm plates 6 and 7 and edges of the base 101 and the cover 102 change.

In the present embodiment, cutting portions 6a and 7a are respectively formed on the diaphragm plates 6 and 7. The cutting portions 6a and 7a allow the aperture formed by the diaphragm plates 6 and 7 and the edges of the base 101 and the cover 102 to have a desired shape. The cutting portions 6a and 7a have arbitrary shapes and sizes thereof. The cutting portions 6a and 7a may be omitted.

Next, a mechanism for displacing the diaphragm plates will be described. Opening portion 63 and 73 are respectively formed on the diaphragm plates 6 and 7. Racks 64 and 74 are respectively formed on a part of upper side of the opening portion 63 and a part of lower side of the opening portion 73. The gear unit 1 is rotatably held by the base 101. A rotation axis of the gear unit 1 is set to be substantially laid on center lines of the opening portions 63 and 73 in vertical directions thereof. The gear unit 1 is composed of a pinion 13, a gear 11 and a circular arc portion 12 concentrically connected to one another in this order from the side of base 101. The three members concentrically rotate one another.

Eight concave circular arcs are formed on the circular arc portion 12 at regular intervals (45 degrees pitch) along a circumferential direction thereof. Therefore, there are seven portions each of which causes the diaphragm plates 6 and 7 to be displaced and then stopped. It is noted that the number of concave circular arcs is not limited to eight. The number of concave circular arcs may be changed according to the number of portions each of which causes the diaphragm plates 6 and 7 to be displaced and then stopped.

Teeth of the pinion 13 of the gear unit 1 mesh with teeth of the racks 64 and 74 of the diaphragm plates 6 and 7. When the gear unit 1 rotates, this converts rotation of the pinion 13 of the gear unit 1 into linear displacement of the racks 64 and 74 of the diaphragm plates 6 and 7, which moves the diaphragm plates 6 and 7 in directions opposed to each other along the X-axis direction (see FIG. 1).

Next, a mechanism for converting continuous rotational movement of a motor 5 into intermittent rotational movement of the gear unit 1 will be described. In FIG. 7, a rotation axis of the motor 5 is connected to a worm gear 4. In the present embodiment, a stepping motor is used as the motor 5. The stepping motor has a specification in which a motor rotates one revolution with respect to twenty pulses.

A gear unit 3 is composed of a helical gear 31 and a light shielding plate 32. The gear units 2 and 3 are concentrically connected to each other using an axis in the shape of D-letter formed on the gear unit 2 and a hole in the shape of D-letter formed on the gear unit 3 (see FIGS. 4 and 7), which rotates the gear units 2 and 3 simultaneously. The gear unit 2 is composed of a gear portion 21 with partial no tooth and a partial circular arc portion 22 in this order from the side of base 101. The worm gear 4 meshes with a tooth of the helical gear 31 of the gear unit 3. In the present embodiment, when the worm gear 4 rotates fifteen revolutions, the helical gear 31 rotates one revolution. The rotational movement of the motor 5 is converted into rotational movement of the helical gear 31 via the worm gear 4. The gear unit 2 rotates with the gear unit 3 simultaneously.

The gear unit 1 is located adjacent to the gear unit 2. The gear portion 21 with partial no tooth of the gear unit 2 is opposed to the gear 11 of the gear unit 1. The partial circular arc portion 22 of the gear unit 2 is opposed to the circular arc portion 12 of the gear unit 1. Geneva mechanism (Geneva stop) is composed of the gear 11 and the circular arc portion 12 of the gear unit 1 and the gear portion 21 with partial no tooth and the partial circular arc portion 22 of the gear unit 2. The Geneva mechanism is a type of mechanisms for converting continuous rotational movement into intermittent rotational movement. In the Geneva mechanism, a part performing the continuous rotational movement is called a drive wheel and a part performing the intermittent rotational movement is called a driven wheel. In the present invention, the gear unit 2 functions as the drive wheel and the gear unit 1 functions as the driven wheel.

We consider a state where the partial circular arc portion 22 of the gear unit 2 functioning as the drive wheel abuts on the circular arc portion 12 of the gear unit 1 functioning as the driven wheel. While the partial circular arc portion 22 of the gear unit 2 abuts on the circular arc portion 12 of the gear unit 1, the gear unit 1 does not rotate even if the gear unit 2 rotates. It is because a convex circular arc in the partial circular arc portion 22 of the gear unit 2 goes around in circle in a concave circular arc in the circular arc portion 12 of the gear unit 1.

As the convex circular arc in the partial circular arc portion 22 of the gear unit 2 goes around in circle, the convex circular arc in the partial circular arc portion 22 of the gear unit 2 gradually comes free from the concave circular arc in the circular arc portion 12 of the gear unit 1. At the same time when the convex circular arc in the partial circular arc portion 22 of the gear unit 2 completely comes free from the concave circular arc in the circular arc portion 12 of the gear unit 1, a tooth of the gear portion 21 with partial no tooth of the gear unit 2 starts to mesh with a tooth of the gear 11. When a tooth of the gear portion 21 with partial no tooth of the gear unit 2 meshes with a tooth of the gear 11, the gear unit 1 starts to rotate according to rotation of the gear unit 2. When an adjacent concave circular arc in the circular arc portion 12 of the gear unit 1 appears according rotation of the gear unit 1, the convex circular arc in the partial circular arc portion 22 of the gear unit 2 starts to slide into the adjacent concave circular arc in the circular arc portion 12 of the gear unit 1. When the convex circular arc in the partial circular arc portion 22 of the gear unit 2 slides into the adjacent concave circular arc in the circular arc portion 12 of the gear unit 1, the gear unit 1 does not rotate even if the gear unit 2 rotates.

By repeating the above-described sequence of action, continuous rotational movement of the gear unit 2 functioning as the drive wheel is converted into the intermittent rotational movement of the gear unit 1 functioning as the driven wheel. In the present embodiment, since the number of concave circular arcs of the circular arc portion 12 of the gear unit 1 is eight, the gear unit 1 stops at eight different angles. In the state where the convex circular arc in the partial circular arc portion 22 of the gear unit 2 slides into the adjacent concave circular arc in the circular arc portion 12 of the gear unit 1, which makes the gear unit 1 stop, the gear unit 1 does not rotate even if external rotative force is given to the gear unit 1. The state where the gear unit 1 does not rotate is a state where the diaphragm plates 6 and 7 are not displaced in the X-axis direction. In other words, since the gear unit 1 does not rotate even if external force is given to the diaphragm plates 6 and 7, the diaphragm plates 6 and 7 keep a stopped state.

In the circular arc potion 12 of the gear unit 1 according to the diaphragm device for projector in the present embodiment, eight concave circular arcs are formed at regular intervals (45 degrees pitch) along the circumferential direction thereof. On the other hand, in the partial circular arc portion 22 of the gear unit 2, one convex circular arc is formed. It is desirable that the concave circular arcs of the circular arc portion 12 have the same curvature radius as the convex circular arc of the partial circular arc portion 22 according to a condition where a convex circular arc abuts on a concave circular arc. In the present embodiment, a curvature radius of the concave circular arcs of the circular arc portion 12 has a value within a range between 3 mm and 3.05 mm, and a curvature radius of the convex circular arc of the circular arc portion 22 has a value within a range between 2.975 mm and 3 mm in consideration of dimension error and placement accuracy of members. If the curvature radius of the concave circular arcs of the circular arc portion 12 is larger than the curvature radius of the convex circular arc of the circular arc portion 22 too much, error in a position where the gear unit 1 stops increases. Due to this, it is necessary that a value of the curvature radius of the concave circular arcs of the circular arc portion 12 is set within a range in which the error in the position where the gear unit 1 stops is allowed. On the other hand, if the curvature radius of the convex circular arc of the circular arc portion 22 is larger than the curvature radius of the concave circular arcs of the circular arc portion 12, the convex circular arc is hard to abut on each concave circular arc. Due to this, it is necessary that the curvature radius of the convex circular arc of the circular arc portion 22 is not larger than the curvature radius of the concave circular arcs of the circular arc portion 12 too much.

Figure 8:
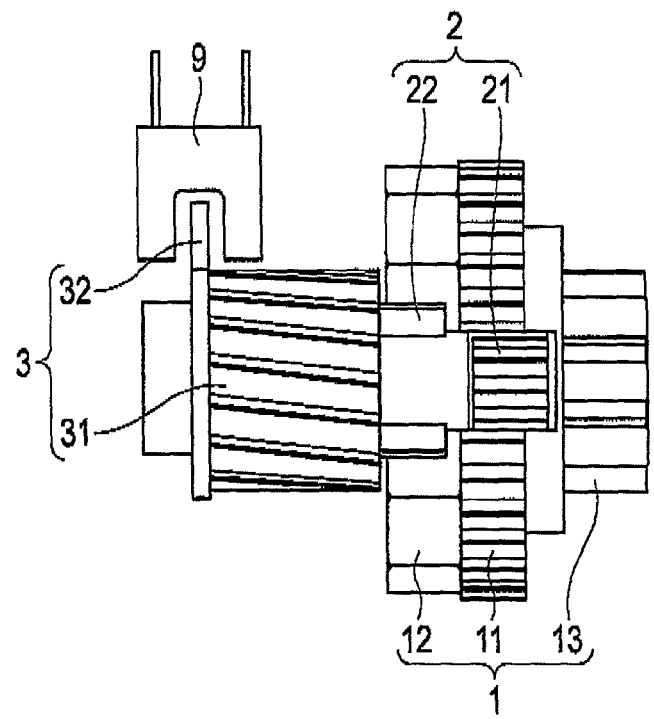
FIG. 8 is a diagram that illustrates a structural relation between a photo sensor 9 and a light shielding plate 32 mounted to the gear unit 3 (third gear unit) according to the first exemplary embodiment of the present invention.

FIG. 8 is a diagram that illustrates a structural relation between a photo sensor 9 and the light shielding plate 32 mounted to the gear unit 3 according to the present embodiment. The photo sensor 9 is arranged to surround the light shielding plate 32 of the gear unit 3 at a time when the light shielding plate 32 passes through the photo sensor 9. When the light shielding plate 32 passes through a gap portion of the photo sensor 9, a light receiving portion of the photo sensor 9 has a light shielding state, which allows rotation phases of the gear units 2 and 3 to be identified. In the present embodiment, a certain amount of error in a position where the photo sensor 9 is mounted is allowed. It is because in a case where a rotation angle at which the gear unit 2 stops rotating fluctuates in some degree, if the gear unit 1 has a stopped state at a certain stop angle, stop positions of the diaphragm plates 6 and 7 are not displaced from certain positions.

FIGS. 9A to 18B are diagrams that illustrate behavior of the gear unit 1 and the diaphragm plates 6 and 7 in a case where the gear unit 2 rotate from 0 degree to 360 degrees. Each of FIGS. 9A to 18A illustrates the whole of diaphragm device for projector. Each of FIGS. 9B, 10B, 17B and 18B illustrates that the gear units 1 and 2 (and the gear unit 3) and the photo sensor 9 shown in each of FIGS. 9A, 10A, 17A and 18A are enlarged. Each of FIGS. 9C and 11B to 16B illustrates that the gear units 1 and 2 shown in each of FIGS. 9A and 11A to 16A are enlarged. It is noted that the gear units 2 and 3 are concentrically connected each other and rotate at the same time as described above.

Figure 9A:
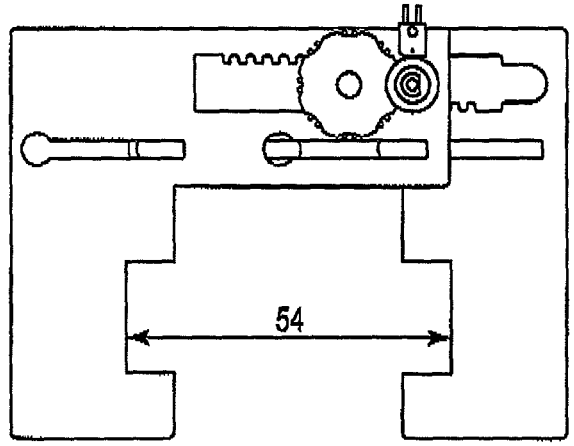
FIGS. 9A to 9C are diagrams that illustrate behavior of the gear unit 1 (second gear unit) and diaphragm plates 6 and 7 in a case where a rotation angle of the gear unit 2 (first gear unit) is 0 degree.
Figure 9B:
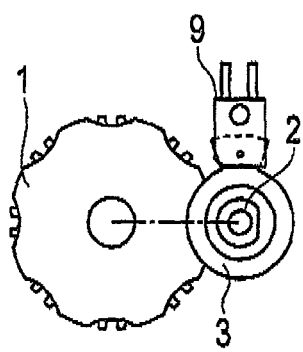
Figure 9C:
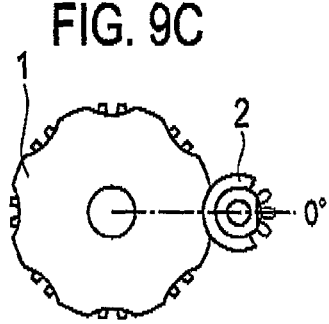

FIGS. 9A to 9C illustrate a state where the light shielding plate portion 32 passes through the photo sensor 9 to prevent the photo sensor 9 from receiving light. A rotation angle of the gear unit 2 at this position is defined as 0 degree. The gear unit 2 performs the continuous rotational movement in an anticlockwise direction. The gear unit 1 performs the intermittent rotational movement in a clockwise direction. A distance between the cutting portion 6a of the diaphragm plate 6 and the cutting portion 7a of the diaphragm plate 7 is set to 54 mm as an initial value.

Figure 10A:
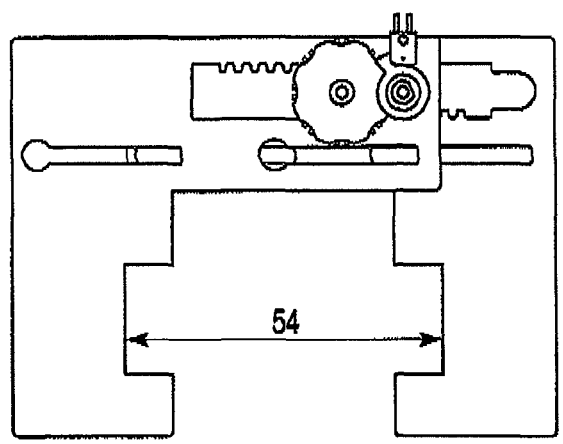
FIGS. 10A and 10B are diagrams that illustrate behavior of the gear unit 1 (second gear unit) and the diaphragm plates 6 and 7 in a case where a rotation angle of the gear unit 2 (first gear unit) is 23 degrees.
Figure 10B:
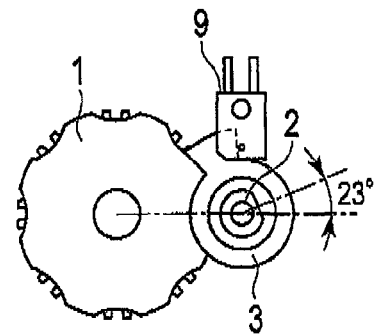
Figure 11A:
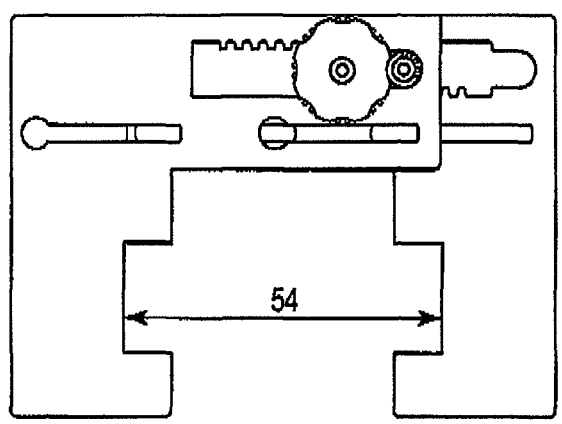
FIGS. 11A and 11B are diagrams that illustrate behavior of the gear unit 1 (second gear unit) and the diaphragm plates 6 and 7 in a case where a rotation angle of the gear unit 2 (first gear unit) is 36 degrees.
Figure 11B:
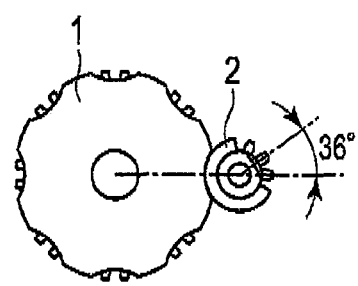

FIGS. 10A and 10B illustrate a state where the gear unit 2 rotates 23 degrees in the anticlockwise direction. FIGS. 11A and 11B illustrate a state where the gear unit 2 rotates 36 degrees in the anticlockwise direction. In these states, the gear unit 1 stops, which prevents the diaphragm plates 6 and 7 from being moved. When the gear units 2 and 3 rotate 23 degrees in the anticlockwise direction, the photo sensor 9 has a light receiving state.

FIGS. 12A and 12B illustrate a state where the gear unit 2 rotates 108 degrees in the anticlockwise direction. When the gear unit 2 rotates 108 degrees in the anticlockwise direction, the gear unit 1 starts to rotate in the clockwise direction, which moves the diaphragm plates 6 and 7 in a direction in which these plates approach each other.

FIGS. 13A and 13B illustrate a state where the gear unit 2 rotates 144 degrees in the anticlockwise direction. FIGS. 14A and 14B illustrate a state where the gear unit 2 rotates 216 degrees in the anticlockwise direction. In these states, the gear unit 1 further rotates in the clockwise direction, which further moves the diaphragm plates 6 and 7 in the direction in which these plates approach each other. FIGS. 15A and 15B illustrate a state where the gear unit 2 rotates 252 degrees in the anticlockwise direction. In the state where the gear unit 2 rotates 252 degrees in the anticlockwise direction, the gear unit 1 finishes rotating, which stops the diaphragm plates 6 and 7.

Figure 16A:
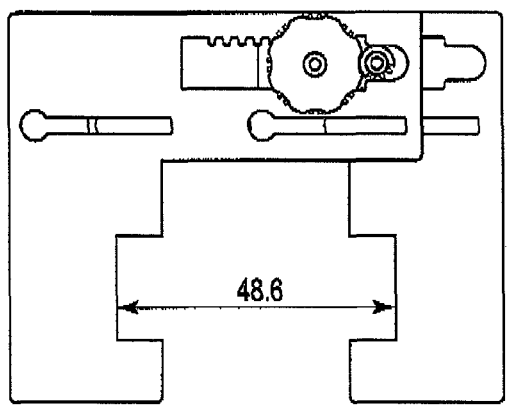
FIGS. 16A and 16B are diagrams that illustrate behavior of the gear unit 1 (second gear unit) and the diaphragm plates 6 and 7 in a case where a rotation angle of the gear unit 2 (first gear unit) is 288 degrees.
Figure 16B:
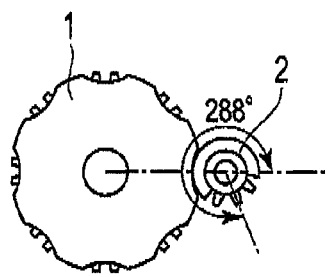
Figure 17A:
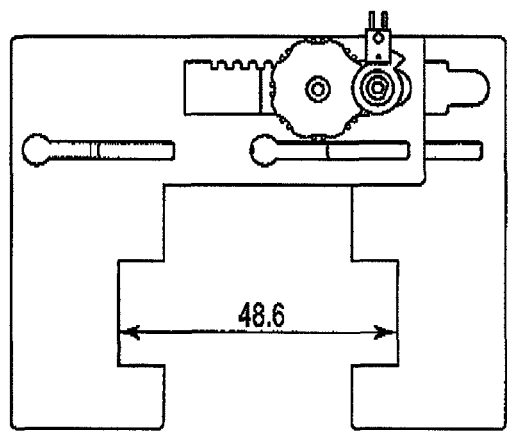
FIGS. 17A and 17B are diagrams that illustrate behavior of the gear unit 1 (second gear unit) and the diaphragm plates 6 and 7 in a case where a rotation angle of the gear unit 2 (first gear unit) is 337 degrees.
Figure 17B:
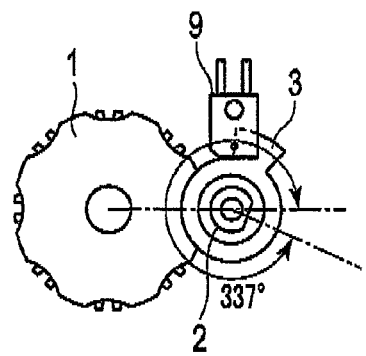

FIGS. 16A and 16B illustrate a state where the gear unit 2 rotates 288 degrees in the anticlockwise direction. FIGS. 17A and 17B illustrate a state where the gear unit 2 rotates 337 degrees in the anticlockwise direction. In these states, even if the motor 5 rotates, the gear unit 1 and the diaphragm plates 6 and 7 keep stopping. When the gear unit 2 rotates 337 degrees in the anticlockwise direction, the photo sensor 9 has the light shielding state where the photo sensor 9 is shielded from receiving light.

Figure 18A:
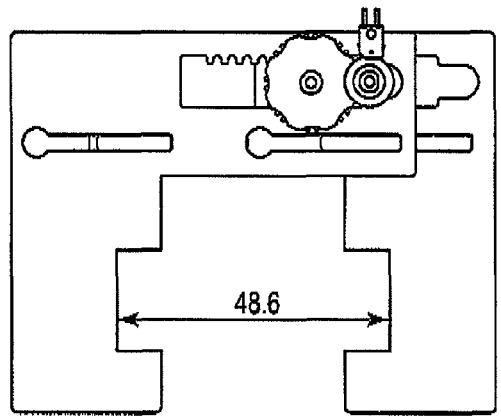
FIGS. 18A and 18B are diagrams that illustrate behavior of the gear unit 1 (second gear unit) and the diaphragm plates 6 and 7 in a case where a rotation angle of the gear unit 2 (first gear unit) is 360 degrees.
Figure 18B:
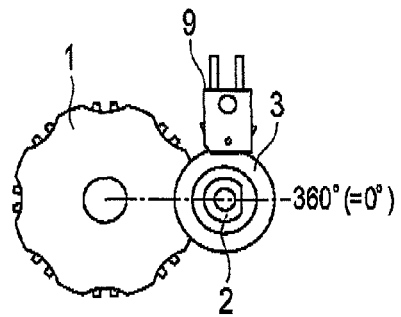

FIGS. 18A and 18B illustrate a state where the gear unit 2 rotates 360 degrees in the anticlockwise direction. When the gear unit 2 rotates 360 degrees in the anticlockwise direction, the distance between the cutting portion 6a of the diaphragm plate 6 and the cutting portion 7a of the diaphragm plate 7 decreases from 54 mm to 48.6 mm. Also, when the gear unit 2 rotates 360 degrees in the anticlockwise direction, the gear unit 1 rotates in the clockwise direction by one concave circular arc in the circular arc portion 12 of the gear unit 1.

When the gear unit 2 further rotates in the anticlockwise direction, relative movement between the gear units 1 and 2 illustrated in FIGS. 9A to 18B is repeated.

Second Exemplary Embodiment

Figure 19:
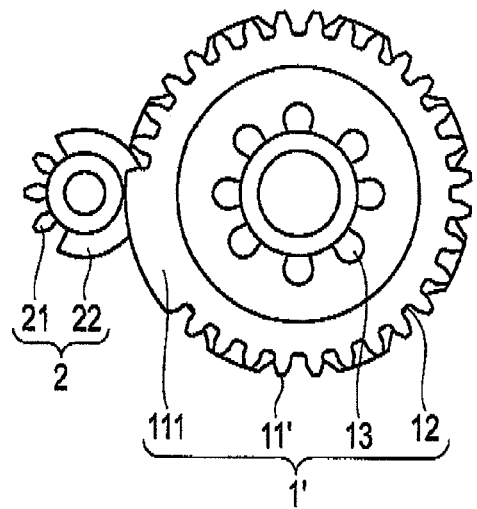
FIG. 19 is a perspective diagram that illustrates a structural relation between a gear unit 1' (second gear unit) and the gear unit 2 (first gear unit) according to a second exemplary embodiment of the present invention.

FIG. 19 is a perspective diagram that illustrates a structural relation between a gear unit 1' and the gear unit 2 according to a second exemplary embodiment of the present invention. In the diaphragm device for projector according to the first exemplary embodiment, teeth are formed on the whole circumference of the gear 11 of the gear unit 1. In contrast, in the diaphragm device for projector according to the second exemplary embodiment, teeth are formed on a partial circumference of the gear 11' of the gear unit 1' except for a region (no tooth portion) 111 where teeth are not formed.

In the diaphragm device for projector according to the second exemplary embodiment, continuous rotational movement of the motor 5 is converted into continuous rotational movement of the helical gear 31 of the gear unit 3 via the worm gear 4 and continuous rotational movement of the gear unit 2 is converted into intermittent rotational movement of the gear unit 1'. However, when the gear unit 1' performs the continuous rotational movement to reach a certain rotation position, the gear portion 21 with partial no tooth of the gear unit 2 reaches the region 111 in the gear 11' of the gear unit 1' where teeth are not formed. At this time, even if the motor 5 rotates, the gear unit 1' does not rotate.

By setting as a specified angle an angle of the region 111 in the gear 11' of the gear unit 1' where teeth are not formed with respect to the racks 64 and 74 of the diaphragm plates 6 and 7 in the X-axis direction, the gear unit 1 does not rotate anymore at a time when the diaphragm plate 6 is closest to the diaphragm plate 7 or when the diaphragm plate 6 is farthest away from the diaphragm plate 7. Namely, by forming the region 111 in the gear 11' of the gear unit 1' where teeth are not formed, the region 111 functions as a stopper at the time when the diaphragm plate 6 is closest to the diaphragm plate 7 or when the diaphragm plate 6 is farthest away from the diaphragm plate 7.

What is claimed is:
1. A diaphragm device for projector comprising:
a first gear unit that includes a partial circular arc portion and a gear portion with partial no tooth;
a second gear unit that includes a circular arc portion on which concave circular arcs are formed along a circumferential direction thereof corresponding to the partial circular arc portion of the first gear unit, and a pinion and a gear corresponding to the gear portion with partial no tooth of the first gear unit, wherein when the partial circular arc portion of the first gear unit abuts on the circular arc portion, the gear does not rotate even if the first gear unit rotates, and when the partial circular arc portion of the first gear unit does not abut on the circular arc portion, the gear portion with partial no tooth of the first gear unit meshes the gear to transmit rotation of the first gear unit to the gear; and two diaphragm plates each on which a rack that meshes the pinion of the second gear unit is formed at a part thereof, that moves in directions opposed to each other according to rotation of the pinion of the second gear unit.

2. The diaphragm device for projector according to claim 1, wherein the gear of the second gear unit includes a no tooth portion at a part thereof, and the second gear unit stops rotating when a tooth of the gear portion with partial no tooth reaches the no tooth portion of the gear of the second gear unit.

\* \* \* \* \*